(12) United States Patent
Cervelli et al.

(10) Patent No.: US 12,403,751 B2
(45) Date of Patent: Sep. 2, 2025

(54) MOTOR VEHICLE INCLUDING CONTROLLABLE REAR WINDOW AND ROOF

(71) Applicant: FERRARI S.P.A., Modena (IT)

(72) Inventors: Daniele Cervelli, Modena (IT); Rubens Curatola, Modena (IT)

(73) Assignee: FERRARI S.P.A., Modena (IT)

( * ) Notice: Subject to any disclaimer, the term of this patent is extended or adjusted under 35 U.S.C. 154(b) by 459 days.

(21) Appl. No.: 18/061,090

(22) Filed: Dec. 2, 2022

(65) Prior Publication Data

US 2023/0226889 A1 Jul. 20, 2023

(30) Foreign Application Priority Data

Dec. 7, 2021 (IT) .................. 102021000030833

(51) Int. Cl.
| | |
|---|---|
| B60J 1/18 | (2006.01) |
| B60J 1/00 | (2006.01) |
| B60J 7/057 | (2006.01) |
| B60J 7/22 | (2006.01) |

(52) U.S. Cl.
CPC .............. B60J 1/183 (2013.01); B60J 1/007 (2013.01); B60J 7/223 (2013.01); *B60J 7/0573* (2013.01)

(58) Field of Classification Search
CPC ........... B60J 7/223; B60J 1/183; B60J 7/1692
See application file for complete search history.

(56) References Cited

U.S. PATENT DOCUMENTS

2020/0148045 A1* 5/2020 Sanham ................ B60J 7/1692

FOREIGN PATENT DOCUMENTS

| DE | 4324708 A1 * | 1/1995 | ............ B60J 1/183 |
|---|---|---|---|
| DE | 19913033 A1 * | 10/2000 | ............ B60J 1/183 |
| DE | 102006054925 A1 | 5/2008 | |
| DE | 102007019237 A1 | 10/2008 | |
| EP | 0761484 A1 | 7/1996 | |

OTHER PUBLICATIONS

Italian Search Report for Application No. 10 2021000030833; Filing Date—Dec. 7, 2021; Date of Mailing—Jul. 8, 2022, 8 pages.

* cited by examiner

*Primary Examiner* — Daniel J Colilla
(74) *Attorney, Agent, or Firm* — CANTOR COLBURN LLP

(57) ABSTRACT

A motor vehicle includes a frame with a first and a second opening, which are oriented transversely to the forward moving direction; a first rear window, which is coupled to the frame in a movable manner between a first position, in which it closes the first opening, and a second position, in which it at least partially frees the first opening; a second rear window, which is coupled to the frame in a movable manner between a third position, in which it closes the second opening, and a fourth position, in which it partially frees the second opening; a roof, which is coupled to the frame in a movable manner between a closed and an open configuration; first driving means, which are configured to automatically place the first and the second rear window in the first and in the second position, respectively, when the roof is in the closed configuration and/or to place the first and the second rear window in the third and in the fourth position, respectively, when the roof is in the open configuration.

15 Claims, 5 Drawing Sheets

MOTOR VEHICLE INCLUDING CONTROLLABLE REAR WINDOW AND ROOF

CROSS-REFERENCE TO RELATED APPLICATIONS

This patent application claims priority from Italian patent application no. 102021000030833 filed on Dec. 7, 2021, the entire disclosure of which is incorporated herein by reference.

TECHNICAL FIELD

The invention relates to a motor vehicle, specifically a convertible motor vehicle and, more specifically, the configuration of its rear windows.

PRIOR ART

As known, a convertible motor vehicle is a type of configurable motor vehicle provided with a body defining a passenger compartment and a roof that is movable in relation to the body between an open configuration, wherein the passenger compartment communicates with the outside, and a closed configuration, wherein the passenger compartment can be isolated from the outside of the motor vehicle.

In some cases, the body has one or more rear openings that are closed by corresponding rear windows, which have the function of isolating the rear of the passenger compartment from the outside with the roof in the closed configuration and, at the same time, of enabling a driver to have rear visibility of the outside of the motor vehicle.

In other cases, the rear windows may be lowered based on the driver's manual controls, as typically happens for the side windows of motor vehicles. Here, with the roof in the open configuration, the lowering of the rear windows into optimal positions has the purpose of improving the motor vehicle's aerodynamics. In fact, the rear windows lowered into the respective positions free the rear openings creating outlets for the air flows that, inevitably, are generated in the rear of the passenger compartment with the roof in the open configuration. At the same time, the return of turbulence from the rear of the motor vehicle is prevented.

In general, there is a need to improve known convertible motor vehicles, in particular by improving the aerodynamics thereof, and the comfort of the configuration, especially in a reliable and reproducible way.

One purpose of this invention is that of meeting the need described above, preferably in a simple and effective way.

DESCRIPTION OF THE INVENTION

The purpose is achieved with a motor vehicle as defined in claim 1.

The dependent claims define particular embodiments of the invention.

BRIEF DESCRIPTION OF THE DRAWINGS

Below, embodiments of the invention will be described to better understand the same by way of non-limiting example and with reference to the attached drawings in which.

EMBODIMENTS OF THE INVENTION

Figure 1:
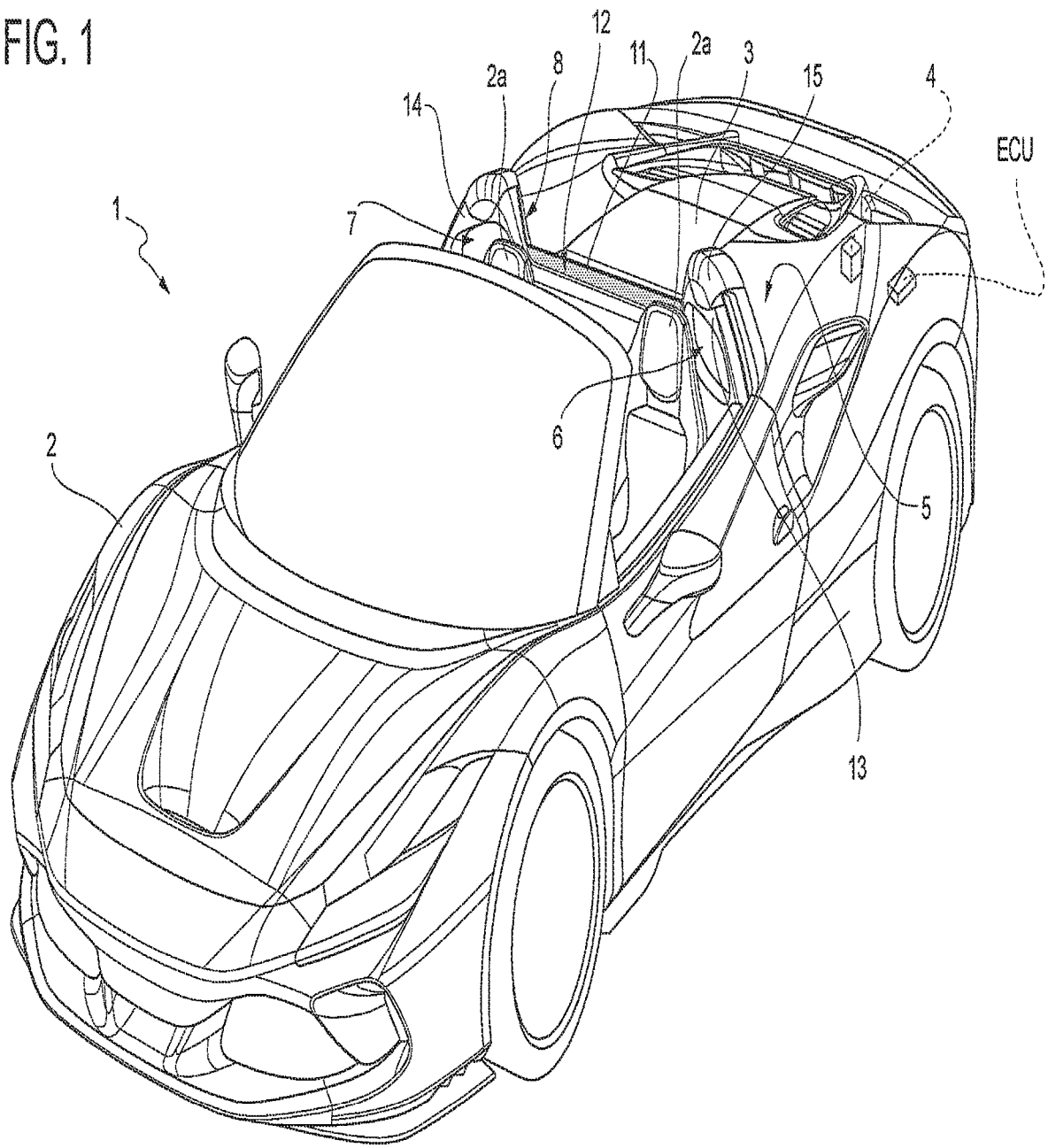
FIG. 1 is a perspective view of a motor vehicle according to the invention in an open-roofed configuration.

In FIG. 1, the reference number 1 is used to indicate, as a whole, a motor vehicle.

The motor vehicle 1 comprises a frame 2 that defines an interior and an exterior of the motor vehicle 1 itself. The interior of the motor vehicle 1 comprises or, more precisely, defines a passenger compartment for a driver. Inside of this, the motor vehicle 1 comprises two seats 2a, for the driver and a passenger respectively. The seats 2a are next to each other.

The motor vehicle 1 is convertible, i.e., it comprises a roof 3, which is coupled to the frame 2 in a movable manner between an open and a closed configuration, in which it covers and uncovers, respectively, the interior or the passenger compartment of the motor vehicle 1 from the top.

Specifically, the motor vehicle 1 comprises an actuator assembly 4, more specifically of a known type schematically illustrated in FIG. 1; the actuator assembly 4 can be controlled to move the roof between the closed and open configuration, the same being clearly included.

The motor vehicle 1 comprises a control unit ECU, specifically configured to control the actuator assembly 4, for which the roof 3 is moved automatically using the actuator assembly 4.

For example, the motor vehicle 1 also comprises, in the passenger compartment, a control, not illustrated, like a button or a lever, coupled to the control unit ECU and able to be manually operated by the driver to request the control unit ECU to move the roof 3, according to the driver's request.

This is not limiting, since the roof 3 could be moved manually as well, so that the actuator assembly 4 is optional. In this case, the control unit ECU could, in any case, be present to perform other functions for the motor vehicle 1, such as will be clear below.

The roof 3 in the open configuration is arranged, in particular, at a rear portion 5 of the frame 2. The portion 5 is rear in relation to a forward direction of the motor vehicle 1, along which the frame 2 extends.

The portion 5 is provided with multiple openings oriented transversely to the forward direction, towards the outside of the motor vehicle 1. In other words, the openings are at the rear, i.e., not on the sides, like those formed on the side doors 2b of the motor vehicle 1, which means that they grant the driver visibility of what is behind the motor vehicle 1, according to the forward direction.

More precisely, the multiple openings include a pair of openings 6, 7 and a third opening 8 arranged between the openings 6, 7, according to a horizontal and transverse direction, more precisely orthogonal to the forward direction. In particular, the opening 8 is arranged basically on the side of each of the openings 6, 7.

In other words, the opening 8 is arranged more internally than each of the openings 6, 7 according to the horizontal direction transverse to the forward direction.

Optionally, the openings 6, 7 are arranged respectively behind the seats 2a.

In addition, preferably, the opening 8 is arranged behind a space between the seats 2a.

The passenger compartment of the motor vehicle 1 can directly communicate with the outside via each of the openings 6, 7, 8.

To cover or close the openings 6, 7, 8, the motor vehicle 1 comprises, respectively, a pair of rear windows 9, 10, and a third rear window 11. The rear windows 9, 10, 11 comprise respective panels or windows for covering or closing the openings 6, 7, 8. In particular, the windows have at least one degree of transparency, to enable visibility of the rear of the motor vehicle 1 from the passenger compartment or interior of the motor vehicle 1.

Each of the rear windows 9, 10, which is coupled to the frame 2 in a movable manner between a closed position, in which it closes the corresponding opening 6, 7, and an open position, in which it at least partially frees the corresponding opening 6, 7.

In effect, more precisely, the rear windows 9, 10 in the open position respectively completely free the openings 6, 7, thus enabling an air flow through the whole extension of the openings 6, 7.

Like the openings 6, 7, the rear windows 9, 10 are, respectively, arranged behind the seats 2a.

The rear window 11 is coupled to the frame 2 in a movable manner between an isolated position, in which it closes the opening 8, and a wind deflector position, in which it partially frees the opening 8, thus creating a wind deflector to deflect an air flow directed along the forward direction from the outside towards the inside of the motor vehicle 1.

More specifically, in the wind deflector portion, the rear window 11 projects upwards in relation to a surface 12 of the frame 2. In particular, the rear window 11 projects by a length ranging between 10 and 40 mm.

More precisely, with the roof 3 in the open configuration, the rear window 11 performs the wind deflector function, i.e., it limits the reverse flow of outside air moved by the forward movement of the motor vehicle 1 inside the same from the rear, thus reducing the turbulence inside the motor vehicle 1.

In general, the function of the wind deflector for convertible motor vehicles is commonly known, so it is not explained in further detail.

The applicant evaluated the above-mentioned length, more preferably equal to 25 mm, as optimal.

Like the opening 8, the rear window 11 is arranged behind the space between the seats 2a.

Specifically, each of the rear windows 9, 10, 11 are movable upwards along a straight direction A, more specifically a vertical direction.

In particular, the openings 6, 7, 8 have, independently, respective contours 13, 14, 15 defined by the frame 2, more precisely by the portion 5.

More specifically, each of the contours 13, 14, 15 comprises or consists of multiple contour surfaces of the frame 2, more precisely of the portion 5.

Each of the contours 13, 14, 15 has or defines a slit through which the corresponding rear windows 9, 10, 11 are movable.

In particular, the contours 13, 14 are closed and delimit the corresponding openings 6, 7. Therefore, in the closed position, the rear windows 9, 10 are, respectively, circumscribed by the contours 13, 14. In other words, the rear windows 9, 10 extend through the contours 13, 14 in the closed position.

Thus, the interior of the motor vehicle 1 cannot communicate with the outside through the openings 6, 7 when the corresponding rear windows 9, 10 are in the closed position, since the openings 6, 7 are completely isolated from the outside by means of the corresponding rear windows 9, 10.

On the other hand, in particular, the contour 15 is open, more specifically above. In any case, the rear window 11 is delimited below and to the sides by the contour 15, so that the rear window 11 extends, in any case, through the contour 15, more precisely both in the isolated position and in the wind deflector position.

The contour 15 comprises the surface 12, which defines a lower contour portion for the opening 8 and, as a result, for the rear window 11, specifically in both the isolated and wind deflector position.

Thus, as illustrated in FIG. 1, the openings 6, 7 are completely delimited by corresponding contours 13, 14, while the opening 8 is not delimited above, but only below and to the sides by the contour 15.

Figure 5:
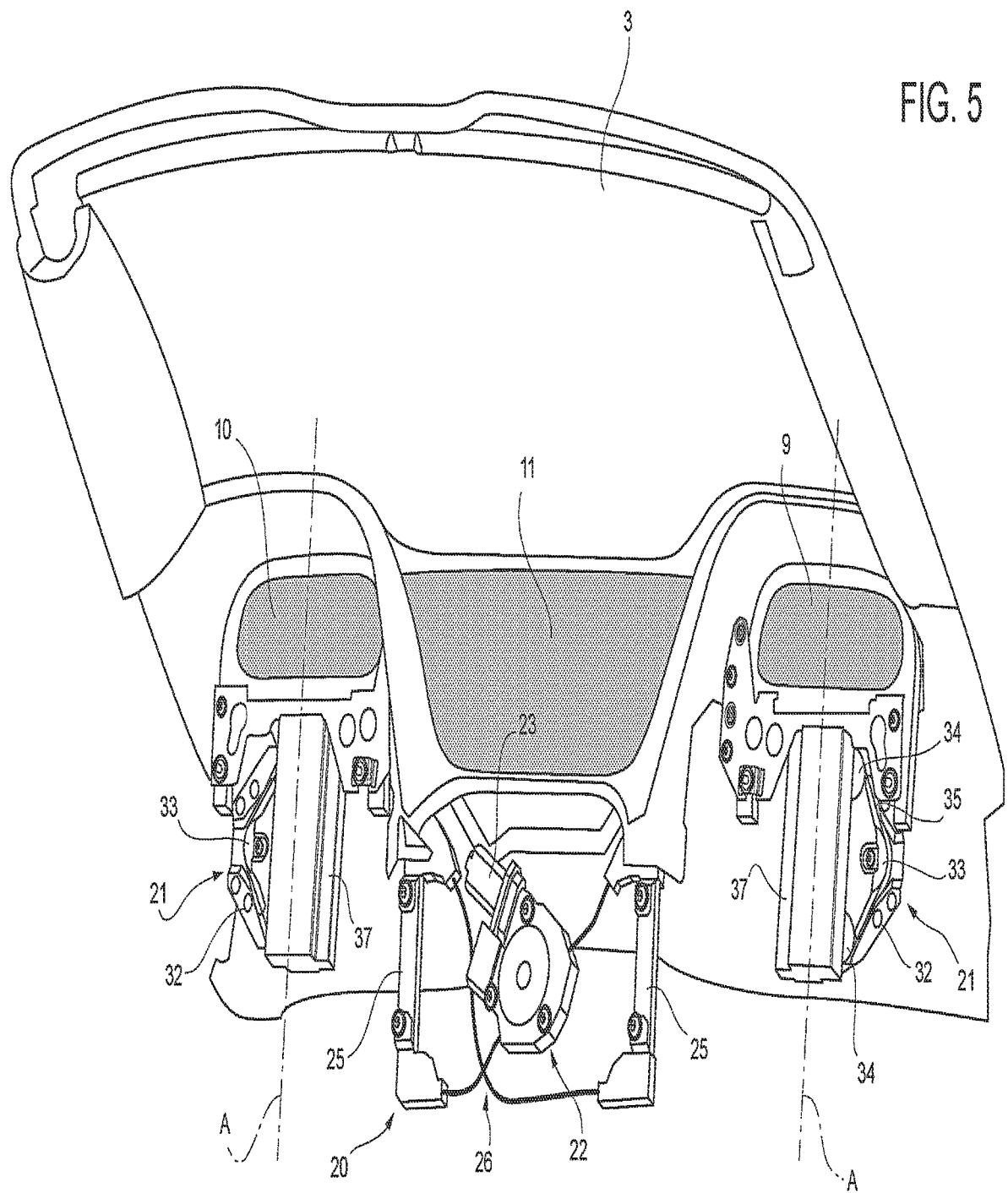
FIG. 5 is a perspective view of an interior of the motor vehicle in FIG. 1 in a closed-roof configuration.

When the roof 3 is in the closed configuration, as illustrated in FIG. 5, the roof 3 itself delimits the opening 8 above. Thus, the interior of the motor vehicle 1 cannot communicate with the outside through the opening 8 when the roof 3 is in the closed configuration and, at the same time, when the rear window 11 is in the isolated position, since the opening 8 is completely isolated from the outside by means of the rear window 11 and the roof 3 together.

According to the invention, the motor vehicle 1 comprises driving apparatus configured to automatically arrange the rear windows 9, 10 in the corresponding closed positions and the rear window 11 in the isolated position when the roof 3 is in the closed configuration. Alternatively, or in addition, the driving apparatus is configured to automatically arrange the rear windows 9, 10 in the corresponding open positions and the rear window 11 in the wind deflector position when the roof 3 is in the open configuration.

In this way, with the roof 3 in the closed configuration, the rear of the passenger compartment is isolated from the outside, while rear visibility is ensured by the rear windows 9, 10, 11. On the other hand, with the roof 3 in the open configuration, the openings 6, 7 define an aerodynamic channel towards the outside for the air moved by the motor vehicle 1, while the rear window 11 performs its wind deflector function.

For simplicity's sake, the following will refer to one of the rear windows 9, 10 alone, in particular to the first rear window 9, keeping in mind that everything that will be described with reference to the rear window 9 is also similarly applicable to the second rear window 10. In addition, this can be directly drawn from the figures, without ambiguity. In other words, the first rear window 9 may, from hereon, be replaced with the second rear window 10.

According to a first, non-limiting example, the driving apparatus comprises a control unit, conveniently, but not necessarily, coinciding with the control unit ECU, and a determination device configured to determine the current configuration of the roof 3, i.e., to determine when the roof 3 is in the closed configuration and/or when the roof 3 is in the open configuration.

The determination device is preferably part of the control unit ECU. Therefore, the control unit ECU is configured to acquire information relating to the current configuration of the roof 3, i.e., indicative of the current configuration of the roof 3. Giving a practical example, in the case where the control unit ECU is configured to control the actuator assembly 4, the same control unit ECU could determine or derive the current configuration of the roof 3 based on how it controls the actuator assembly 4. In fact, the control unit ECU controls the actuator assembly 4 by processing a control signal that defines a reference corresponding to a desired configuration of the roof 3. This is true for both cases in which the actuator assembly 4 is controlled in an open or closed ring by the control unit ECU. Therefore, the control unit ECU can assume, during or at the end of the control, that the current configuration coincides with the reference, i.e., with the desired configuration.

Alternatively, the determination device may comprise a transducer, which would be coupled to the control unit ECU and configured to detect the current configuration of the roof 3, as well as to generate an associated signal. Thus, the control unit receives the associated signal and acquires the information relating to the current configuration from the signal received.

As mentioned above, this would clearly also be true if there were no assembly 4. The control unit ECU could, in any case, be present together with the determination device for the determination of the current configuration, i.e., of when the roof is in the closed and/or open configuration and for acquiring the corresponding information.

Again, with reference to the first example, the driving apparatus also comprises an actuator assembly 20 which can be controlled to move the rear windows 9, 11.

Thus, the control unit ECU is configured to control the actuator assembly 20, precisely based on the information acquired, so that the actuator assembly 20 arranges the rear windows 9, 11 respectively in the closed position and isolated position when the roof 3 is in the closed configuration, i.e., when the information acquired indicates that the roof 3 is in the closed configuration.

Alternatively, or additionally, the control unit ECU is configured to control the actuator assembly 20, precisely based on the information acquired, so that the actuator assembly 20 arranges the rear windows 9, 11 respectively in the open position and in the wind deflector position when the roof 3 is in the open configuration, i.e., when the information acquired indicates that the roof 3 is in the open configuration.

To summarise, in operating the motor vehicle 1 according to the first example, the driver manually performs or requests via a special control a transition of the roof 3 from the closed configuration to the open configuration or vice versa. The control unit ECU determines or acquires information on when the roof 3 is in the closed or open configuration. As a result, the control unit ECU controls the actuator assembly 20 to arrange the rear windows 9, 11 in the corresponding closed and isolated positions when the roof 3 is in the closed configuration and to arrange the same rear windows 9, 11 in the corresponding open and wind deflector positions when the roof 3 is in the open configuration.

According to a second, non-limiting example, which may be combined with the first, the driving apparatus is coordinated with the actuator assembly 4 to move the rear windows 9, 11 respectively from the closed position to the open position and from the isolation position to the wind deflector position in response to a transition of the roof 3 from the closed configuration to the open configuration.

Alternatively or additionally, the driving apparatus is coordinated with the actuator assembly 4 to move the rear windows 9, 11 respectively from the open position to the closed position and from the wind deflector position to the isolated position in response to a transition of the roof 3 from the open configuration to the closed configuration.

The coordination between the driving apparatus and the actuator assembly 4 may be effectively implemented in many ways, for example via one or more mechanisms coordinated between them and either complex or simple, potentially also according to the shared technical knowledge of the mechanics, which includes knowledge of known transmissions and actuators.

In this second example, the actuator assembly 4 could be replaced with a mechanism enabling the manual handling of the roof 3 between the closed configuration and the open configuration. In fact, the coordination between the driving apparatus and this mechanism would, in any case, be possible mechanically or even electronically. The latter mechanism is clearly a driving device, in this case not automatic but manual.

Giving a practical example, the coordination could occur via a sensor device designed to detect the transition of the roof 3 from the closed configuration to the open configuration and/or the inverse transition, with the driving apparatus that would act in response to the detection of the transition.

In this second example, the driving apparatus preferably comprises a control unit, conveniently but not necessarily coinciding with the control unit ECU, and the actuator assembly 20.

The control unit ECU is configured to control the actuator assembly 20 as a function of how the roof 3 is moved or controlled, for example manually, to coordinate as described above.

For example, the control unit ECU could be coupled with the sensor device and configured to acquire information relating to the transition of the roof 3 from the sensor device. Thus, the control unit ECU would control the actuator assembly 20 based on the information acquired so as to implement the coordination described above.

Preferably, but not necessarily, the control unit ECU controls the actuator assembly 20 as a function of how the same control unit ECU controls the actuator assembly 4, which defines a driving device, in this case an automatic one.

To summarise, in operating the motor vehicle 1 according to the second example, the driver manually performs or requests via a special control a transition of the roof 3 from the closed configuration to the open configuration or vice versa. The control unit ECU determines the transition and controls, as a result, the actuator assembly 20 in a coordinated way in relation to the transition.

Specifically, the actuator assembly 20 comprises a servo-mechanism 21 that can be controlled by the control unit ECU to move the rear window 9 between the closed position and the open position, the latter included.

In addition, the actuator assembly 20 comprises another servo-mechanism 22 that is independent of the servo-mechanism 21 and can be controlled by the control unit ECU to move the rear window 11 between the isolated position and the wind deflector position, the latter included.

Figure 2:
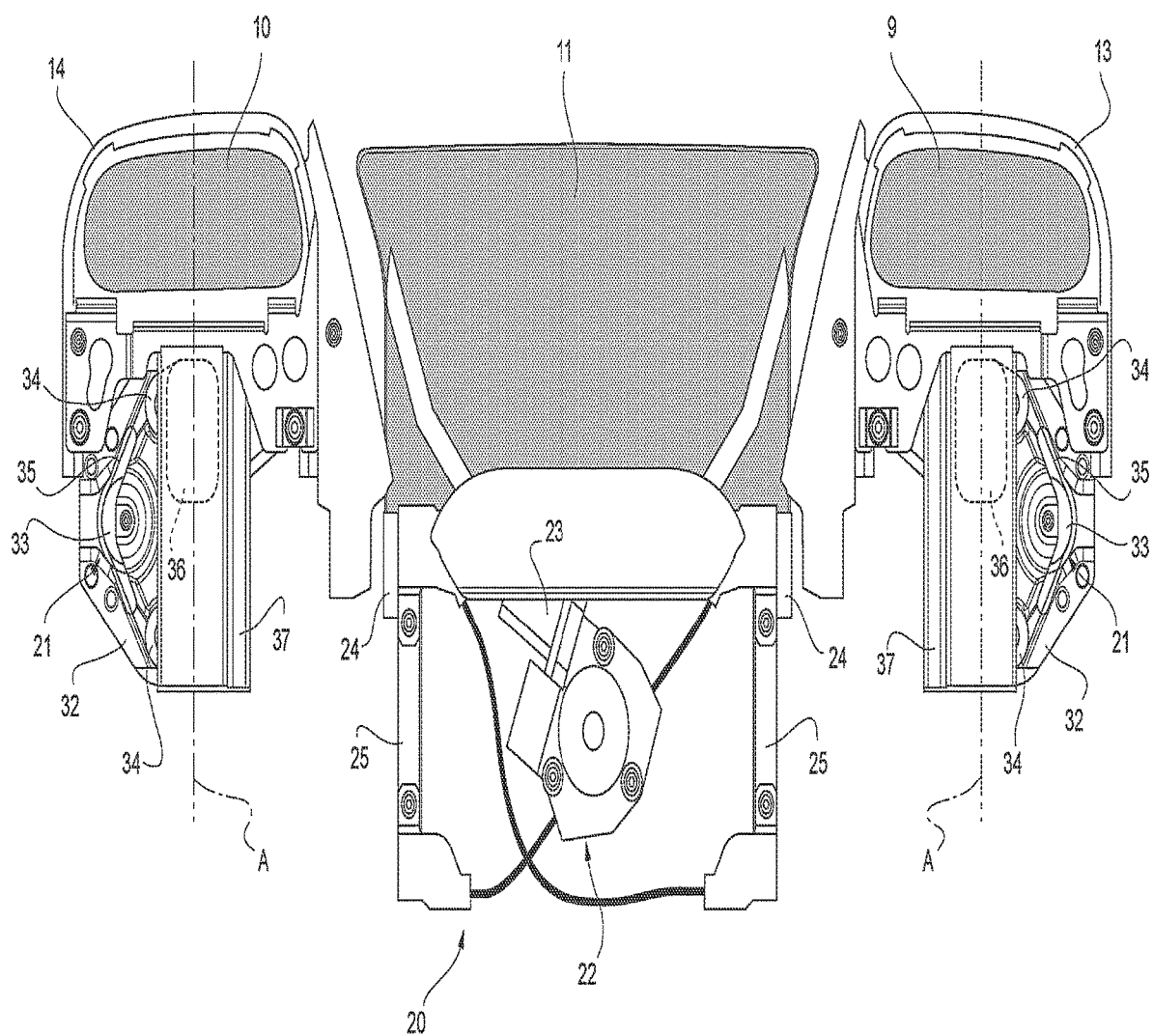
FIG. 2 is a front view on an enlarged scale of a rear portion of the motor vehicle in FIG. 1.

For example, the servo-mechanism 22 is of a known type, in particular similar to the typical servo-mechanisms used to raise and lower the side windows of known, common motor vehicles. For this reason, the servo-mechanism 22 is illustrated schematically in FIG. 2 and described summarily in its essential elements. The servo-mechanism 22 comprises a motor 23 that can be controlled by the control unit ECU, a pair of slides 24 to which the rear window 11 is fixed, a pair of parallel straight guides 25 respectively carried by separate fixed brackets and configured to guide, respectively, the slides 24 along respective parallel, straight directions, as well as a transmission with flexible members 26 configured to transmit motion leaving the motor 23 to the slides 24 along the corresponding straight directions. The transmission 26 comprises two pairs of pulleys not illustrated respectively carried by the brackets fixed at the guides 25.

The servo-mechanism 21 comprises a motor 30 that can be controlled by the control unit ECU and a transmission 31 configured to transmit motion leaving the motor 30 to the rear window 9.

Figure 3:
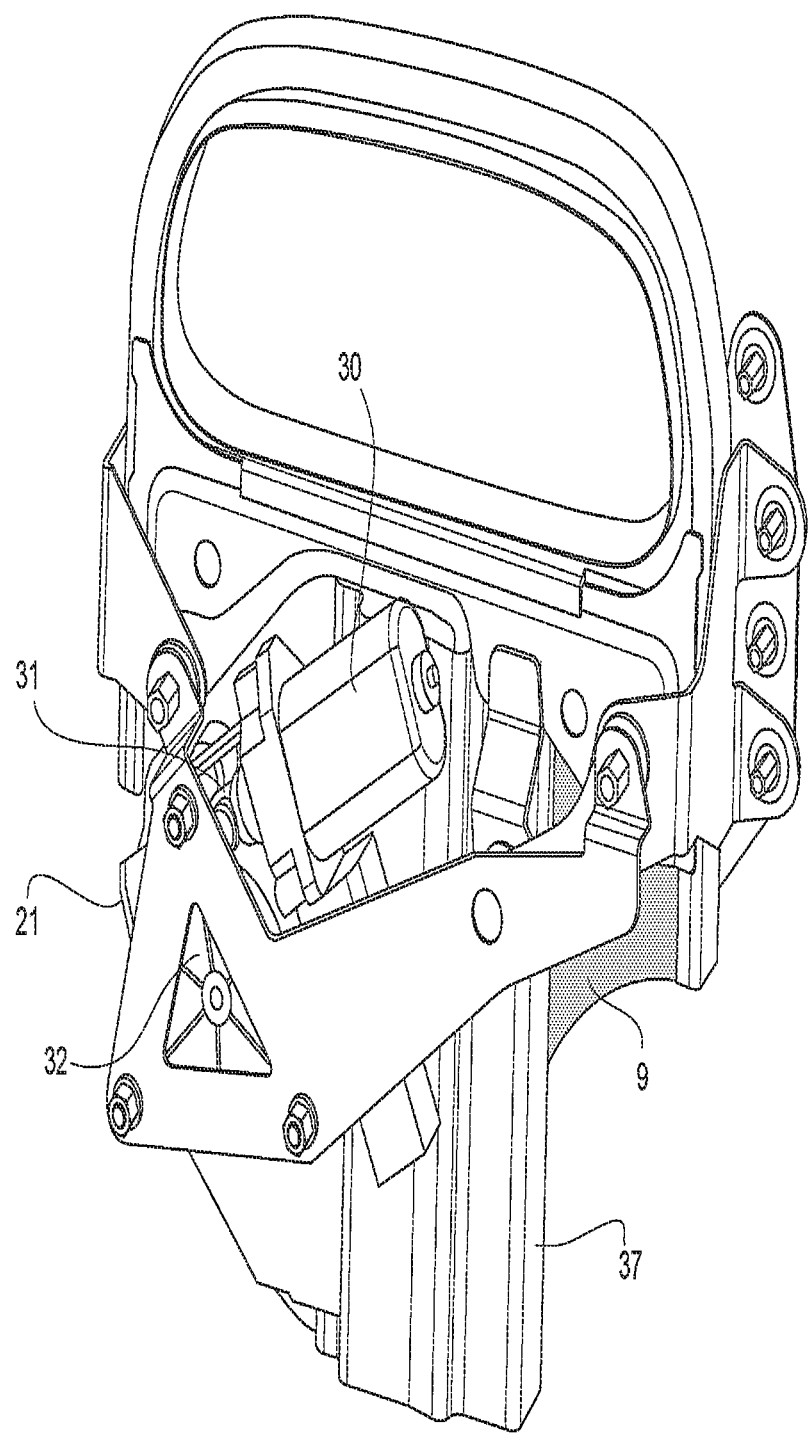
FIG. 3 is a perspective view of a detail of the rear portion in FIG. 2.
Figure 4:
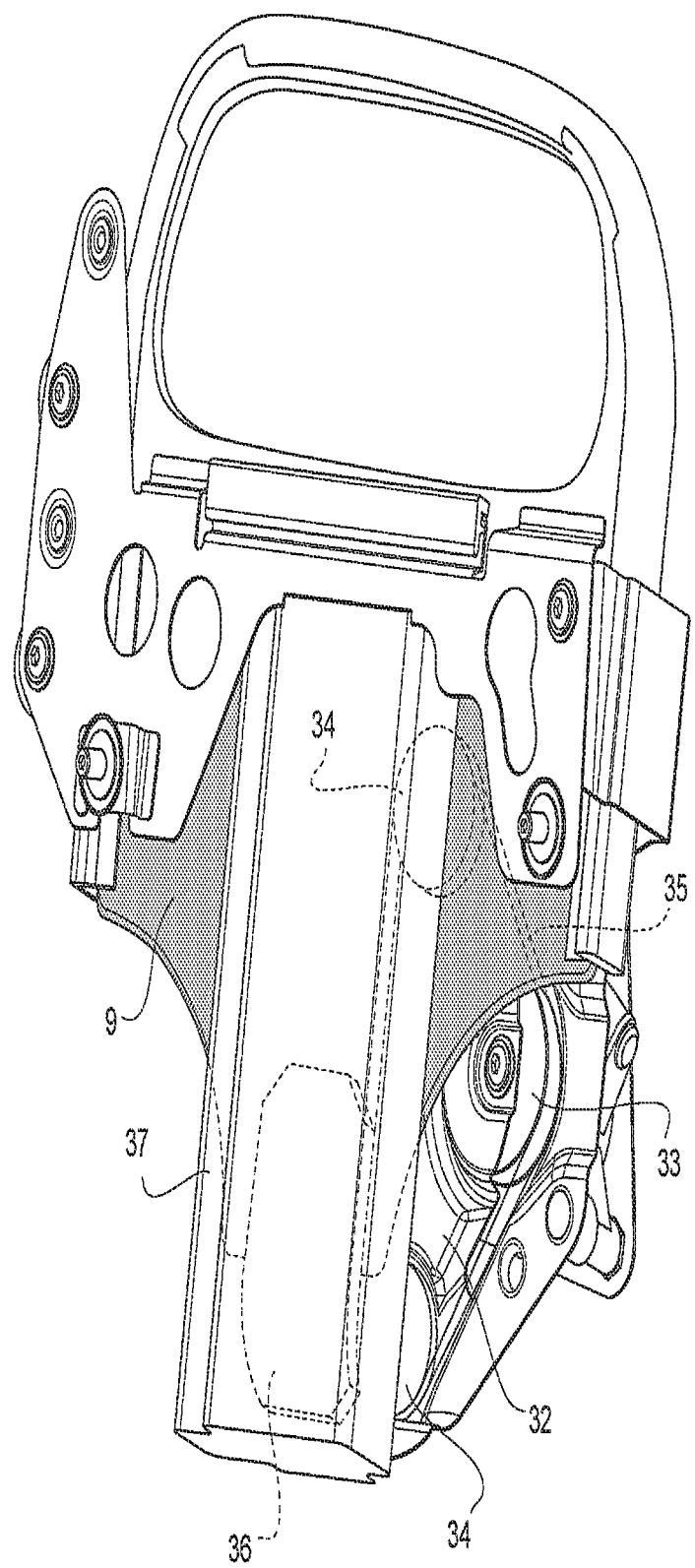
FIG. 4 is an additional, perspective view of the detail in FIG. 3 from the opposite point of view, according to a forward direction of the motor vehicle in FIG. 1.

Advantageously, as better illustrated in FIGS. 3 and 4, the frame 2, more specifically the portion 5 comprises a bracket 32 carrying the motor 30 and the transmission 31.

Specifically, the motor 30 and the transmission 31 are carried by the bracket 32 directly.

The transmission 31 preferably comprises multiple pulleys, specifically comprising a drive pulley 33 configured so as to be guided in rotation by the motor 30, and two driven pulleys 34.

More preferably, the transmission 31 comprises a coupling 29 of the worm screw and worm gear type to transmit the motion leaving the motor 30 to the pulley 33, i.e., to rotate the drive pulley 33.

The pulleys 33, 34 are carried by the bracket 32, in particular directly, so that they rotate around respective, parallel axes, in particular parallel to the forward moving direction.

In addition, the transmission 31 comprises a flexible member 35, for example a belt or a cable, wrapped around the pulleys 33, 34 so as to be moved, at least by the drive pulley 33, in rotation.

More specifically, the pulleys 33, 34 are arranged so as to stretch the flexible member 35. The pulleys 35 are driven in rotation by the rotation of the pulley 33 via the stretched flexible member 35.

The rear window 9 is coupled to the flexible member 35 in a fixed manner.

In particular, the transmission 31 further comprises a slide 36 coupled to the flexible member 35 in a fixed manner, and a straight guide 37 fixed relative to the bracket 32 and configured to guide a translation of the slide 36 in response to a movement of the flexible member 35.

The rear window 9 is fixed to the slide 36. Specifically, the slide 36 translates along the direction A.

The straight guide 37 is preferably carried by the bracket 32 in a fixed position in relation to the same, in particular directly. The straight guide 37 could also, potentially, be formed on the bracket 32.

As can be seen in FIGS. 3, 4, the pulleys 33, 34 and the flexible member 35 are coplanar transversely to the forward moving direction. In other words, the pulleys 33, 34 define a flat transmission that, specifically, extends conceptually on a plane transverse to the forward moving direction, more precisely orthogonal to it.

As already mentioned above, the servo-mechanism 21 is also used to move the rear window 10, in a similar way to the rear window 9.

From the above, the advantages of the motor vehicle 1 according to the invention are clear.

In particular, the coordination between the configuration of the roof 3 and the positions of the rear windows 9, 10, 11 occurs automatically, without the driver's manual intervention on the rear windows 9, 10, 11. The coordination leads, in addition, to advantageous conditions, so that the rear of the passenger compartment remains isolated from the outside with the roof 3 in the closed configuration, without any loss of rear visibility, and so that the aerodynamics and the comfort of the driver are optimised with the roof 3 in the open configuration.

In this way, the comfort of the driver is maximised, since the operations to obtain the above-mentioned advantageous conditions are minimised.

In addition, the servo-mechanism 21 is particularly advantageous, since the transmission 31 and the motor 20 are carried directly by the sole bracket 32. This entails reduced dimensions, especially if compared with those of the guides 25 and, more generally, of the servo-mechanism 22.

Finally, it is clear that changes may be made to the motor vehicle 1 according to the invention, and variations produced thereto, that, in any case, do not depart from the scope of protection defined by the claims.

In particular, there may only be one of the rear windows 9, 10. In addition, the shape of the roof 2 could be other than that actually illustrated.

The invetion claimed is:

1. A motor vehicle (1) comprising:
    a frame (2), which extends along a forward moving direction of the motor vehicle (1) and has a rear portion (5), according to the forward moving direction, with a first and a second opening (6, 7, 8), which are oriented transversely to the forward moving direction, towards the outside of the motor vehicle (1);
    a first rear window (9, 10), which is coupled to the frame (2) in a movable manner between a first position, in which it closes the first opening (6, 7), and a second position, in which it at least partially frees the first opening (6, 7);
    a second rear window (11), which is coupled to the frame (2) in a movable manner so as to move between a third position, in which it closes the second opening (8), and a fourth position, in which it partially frees the second opening (8), thus creating a wind deflector to deflect an air flow directed along the forward moving direction from the outside towards the inside of the vehicle (1);
    a roof (3), which is coupled to the frame (2) in a movable manner between a closed and an open configuration, in which it covers and uncovers, respectively, the inside of the motor vehicle (1) from the top;
    first driving means (ECU, 20), which are configured to automatically place the first and the second rear window (9, 10, 11) in the first and in the third position, respectively, when the roof (3) is in the closed configuration and/or to place the first and the second rear window (9, 10, 11) in the second and in the fourth position, respectively, when the roof (3) is in the open configuration.

2. The motor vehicle according to claim 1, wherein the first driving means (ECU, 20) comprise
    determination means (ECU) to determine when the roof (3) is in the closed configuration and/or in the open configuration;
    a control unit (ECU), which is configured to acquire a piece of information from the determination means relating to when the roof (3) is in the closed configuration and/or in the open configuration; and
    an actuator assembly (20), which is controllable to move the first and the second rear window (9, 10, 11);
    wherein the control unit (ECU) is configured to control the actuator assembly (20) so that the actuator assembly (20) places the first and the second rear window (9, 10, 11) in the first and in the second position, respectively, when the roof (3) is in the closed configuration and/or places the first and the second rear window (9, 10, 11) in the third and in the fourth position, respectively, when the roof (3) is in the open configuration.

3. The motor vehicle according to claim 1 and further comprising second driving means (4), which are controllable so as to move the roof (3) between the closed configuration and the open configuration;

wherein the first driving means (ECU, 20) are coordinated with the second driving means (4) in order to move the first and the second rear windows (9, 10, 11) from the first to the second position and from the third to the fourth position, respectively, in response to a shift of the roof (3) from the closed configuration to the open configuration, and/or in order to move the first and the second rear window (9, 10, 11) from the second to the first position and from the fourth to the third position, respectively, in response to a further shift of the roof (3) from the open configuration to the closed configuration.

4. The motor vehicle according to claim 3, wherein the first driving means comprise:

a control unit (ECU); and an actuator assembly (20), which is controllable to move the first and the second rear window (9, 10, 11);

wherein the control unit (ECU) is further configured to control the actuator assembly (20) as a function of how the second driving means (4) are controlled.

5. The motor vehicle according to claim 4, wherein the control unit (ECU) is configured to control the second driving means (4).

6. The motor vehicle according to claim 4, wherein the actuator assembly (20) comprises a first servo-mechanism (21), which is controllable by the control unit (ECU) to move the first rear window (9, 10) between the first and the second position; and a second servo-mechanism (22), which is independent of the first servo-mechanism (21) and is controllable by the control unit (ECU) so as to move the second rear window (11) between the third and the fourth position.

7. The motor vehicle according to claim 6, wherein the first servo-mechanism (21) comprises a motor (30) controllable by the control unit (ECU) and a transmission (31) configured to transmit a motion outputted by the motor (30) to the first rear window (9, 10), wherein the motor (30) and the transmission (31) are carried by a same bracket (32) of the frame (2).

8. The motor vehicle according to claim 7, wherein the transmission (31) comprises a plurality of pulleys (33, 34), which are carried by the bracket (32) in a rotatable manner about respective parallel axes; and a flexible member (35), which is wound on the pulleys (33, 34) in a manner to be moved by at least one of the pulleys (33, 34) in rotation;

wherein the first rear window (9, 10) is coupled to the flexible member (35) in a fixed manner.

9. The motor vehicle according to claim 8, wherein the transmission (31) further comprises a slide (36) coupled to the flexible member (35) in a fixed manner, and a straight guide (37) fixed relative to the bracket (32) and configured to guide a translation of the slide (36) in response to a movement of the flexible member (35), wherein the first rear window (9, 10) is fixed to the slide (36).

10. The motor vehicle according to claim 8, wherein the pulleys (33, 34) and the flexible member (35) are coplanar transversely to the forward moving direction.

11. The motor vehicle according to claim 1, wherein the first rear window (9, 10), in the second position, completely frees the first opening (6, 7) so as to allow a further air flow to flow through the entire extension of the first opening (6, 7).

12. The motor vehicle according to claim 1, wherein the first rear window (9, 10) and/or the second rear window (11) are movable upwards along a straight direction (A).

13. The motor vehicle according to claim 1 and comprising a seat (2a), wherein the first rear window (9, 10) is arranged behind the seat (2a), according to the forward moving direction.

14. The motor vehicle according to claim 1, wherein the frame (2) defines at least one contour (13, 14, 15) for the first or the second opening (6, 7, 8), the contour (13, 14, 15) having a slit, through which the first or the second rear window (9, 10, 11), respectively, is movable.

15. The motor vehicle according to claim 14, wherein a portion of the contour about the first rear window (13, 14) is closed and defines the first opening (6, 7).

* * * * *